(12) United States Patent
Giewont et al.

(10) Patent No.: US 8,734,120 B2
(45) Date of Patent: May 27, 2014

(54) COMPRESSOR STARTING METHOD AND APPARATUS

(75) Inventors: William Giewont, Boiling Springs, PA (US); Todd Snider, Fort Loudon, PA (US); Andreas Doktar, Vaasa (FI)

(73) Assignee: Vacon Oyj, Vaasa (FI)

( * ) Notice: Subject to any disclaimer, the term of this patent is extended or adjusted under 35 U.S.C. 154(b) by 241 days.

(21) Appl. No.: 13/296,904

(22) Filed: Nov. 15, 2011

(65) Prior Publication Data

US 2013/0121845 A1 May 16, 2013

(51) Int. Cl.
*F04B 49/06* (2006.01)
*F04B 35/04* (2006.01)

(52) U.S. Cl.
USPC ............................................ 417/45; 417/415

(58) Field of Classification Search
USPC ................................ 417/44.1, 45, 44.11, 415
See application file for complete search history.

(56) References Cited

U.S. PATENT DOCUMENTS 5,801,500 A * 9/1998 Jensen et al. ............. 318/400.09

* cited by examiner

*Primary Examiner* — Bryan Lettman
(74) *Attorney, Agent, or Firm* — Birch, Stewart, Kolasch & Birch LLP

(57) ABSTRACT

A piston type compressor wherein the position of the piston highest pressure point is indicated and the rotor of the motor at the optimal starting angle aligned prior to the actual compression operation by providing a pre-pulse to rotate the rotor of the motor at least one full rotation at a certain frequency, during rotation measuring the load torque by the frequency converter as well as indicating the maximum load torque point and at the end aligning the rotor of the motor at the optimal starting angle of about 180° from the maximum pressure angle, and at the beginning of the actual compression operation setting the rotor position opposite to the maximum torque angle by feeding direct current to the stator winding and starting the motor by supplying maximum motor current to the motor to give the maximum torque and acceleration.

14 Claims, 2 Drawing Sheets

COMPRESSOR STARTING METHOD AND APPARATUS

FIELD OF TECHNOLOGY

This invention relates to a method and an apparatus for controlling a compressor. The invention particularly relates to a method and apparatus for starting a piston type compressor driven by a frequency converter controlled permanent magnet synchronous motor.

DESCRIPTION OF THE PRIOR ART

Piston type compressors are simple, reliable and cost-effective, which has made it a commonly used workhorse in industrial and commercial use e.g. for producing pressurized air. When the produced air volume needs to be adjusted, it is normal to use speed control instead of e.g. a throttle valve control because of lower power losses. The speed control is normally implemented by a frequency converter controlled AC-motor, which can be e.g. a asynchronous squirrel cage motor or a permanent magnet synchronous motor.

The motor load in this application varies significantly based on the position of the piston i.e. when the piston reaches the top position, the shaft torque is high and at the bottom the torque is low. At full speed the mechanical inertia of the rotating mass on the shaft, often enforced by a massive flywheel, helps to cross the maximum torque point even when the motor and converter have been dimensioned according to the average load, as the economical dimensioning principle requires.

This dimensioning principle may cause trouble starting at low speed because the inertia of rotating mass provides minimal help. This is one reason why today the motor and converter are normally dimensioned based on the maximum torque.

In addition to the dimensioning problem, the condition may exist where the piston remains at the top pressure point when the compressor is stopped. In a tightly sealed cylinder the high pressure can remain inside for a long time, which at the next start may lead to a "kickback" during the first rotation. This may lead to a loss of information about the shaft angle in sensor-less drive systems and failure to start.

These problems may force the power of motor and frequency converter to be dimensioned higher than the average power requires and/or a shaft angle sensor may be required.

SUMMARY OF THE INVENTION

The object of the present invention is to provide a novel start-up method for a piston compressor, driven by a frequency converter controlled permanent magnet synchronous motor. By this method the above mentioned disadvantages will be avoided and a reliable start-up of a piston compressor ensured even when the machinery has been dimensioned economically according to the average load and no position sensor is in use. The objective is achieved by a method and apparatus according to the invention, characterized by what is stated in the independent claims. Other preferred embodiments of the invention are disclosed in the dependent claims.

In the method and apparatus of the present invention, the piston compressor is driven by a permanent magnet electric motor, supplied by a frequency converter. The necessary information about the motor shaft angle at the maximum pressure point is sensed without any external sensors.

According to the first embodiment of the invention, the piston compressor start includes three sequential phases.

In the first phase, the motor will be rotated a short period, preferably one full electrical rotation. The purpose of this phase is to release the possible pressure from the cylinder, which has remained there after the previous stop. In this phase the rotating speed is low and the motor current high in order to create a shaft torque high enough to overcome e.g. the possible starting friction.

The purpose of the second phase is to determine the electrical angle of the highest torque, indicating the position of the piston's highest pressure. At the start of the second phase, the rotor position will be preset to a certain electrical angle by feeding direct current to the stator winding. After that, the motor will be rotated at least one full electrical rotation from this angle, at constant speed and at high current in order to create a shaft torque high enough for running over the maximum compression pressure point. During the second rotation, the shaft torque is calculated by using the measured signals of a frequency converter, e.g. by measuring the output current and voltage and calculating the output power which is known to be proportional to the shaft torque. From this calculation the position of the maximum load torque point, expressed in electrical angle from the known starting angle is derived According to the second embodiment of the invention, which may be applied when the relationship between the rotor electrical and mechanical angles is known, the first phase may be omitted. In this case the second phase is started and stopped at the known optimum starting angle. By the rotation it will be ensured that the rotor angle is finally optimum in spite of the friction and gas pressure effects.

The third phase in both embodiments is the start of the actual operation. In the beginning of this phase the rotor position is set to a certain electrical angle by feeding direct current to the stator winding This time the rotor position, determined by the phase currents, is set opposite to the maximum torque angle, i.e. about 180° away from it. This setting gives a maximum time and distance for the first acceleration, thus creating maximum kinetic energy for the first rotation at start. During start a maximum motor current, giving maximum possible torque, is used for creating maximum acceleration. After successful passing the first piston compression point the motor acceleration is continued until the set speed reference has been reached and the normal operation continues.

The start is normally required to take only a few seconds, which means that the allowed frequency converter overload period needs to be split between the pre-pulses and the actual start. Because the overload current, especially at low output frequencies during the pre-pulses, causes an unusually high stress for the power semiconductors of the converter, it is advantageous to keep a pause between all sequential start current pulses as short as possible.

The invention makes it possible to economically dimension the driving motor and frequency converter to less than the maximum load of a piston compressor. It also makes the shaft angle sensor unnecessary.

BRIEF DESCRIPTION OF THE DRAWINGS

Below the invention appears a more detailed explanation using examples with references to the enclosed figures, wherein.

DETAILED DESCRIPTION OF THE INVENTION

Figure 1:
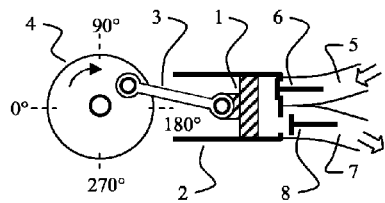
FIG. 1 presents a principal structure of a piston compressor.

FIG. 1 presents the known structure of a piston compressor, where a piston 1 is reciprocating inside a compression cylinder 2. The piston is driven via a connecting rod 3 by a crankshaft or like in this example by a rotating wheel 4. The intake gas enters into the cylinder from a suction tube 5 as the inlet valve 6 opens during the suction phase, i.e. when the piston is creating vacuum inside the cylinder during a move away from the valves. During the compression phase, i.e. during piston move toward the valves, the gas is compressed and finally discharged to the pressure tube 7 as the discharge valve 8 opens. The angle numbers (0° . . . 270°) around the wheel 4 indicate the position mark of the connecting rod fixing point to the wheel and thus also the piston mechanical position during one operation rotation.

Figure 2:
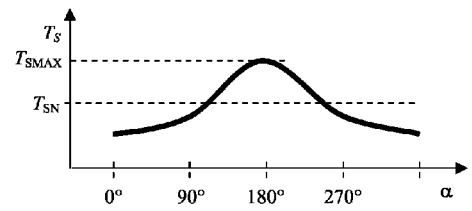
FIG. 2 presents a shaft torque curve of a piston compressor driving motor.

FIG. 2 presents a known characteristic curve of the torque $T_S$ in a shaft driving the wheel 4 (in FIG. 1) or in a corresponding crankshaft. At the angle 0°, when the pressure inside the cylinder is lowest, also the shaft torque is lowest, and when the pressure is highest before the discharge valve opening at around the 180° point, also the torque is highest ($T_{SMAX}$), respectively. $T_{SN}$ denotes the average torque during one full rotation.

Figure 3:
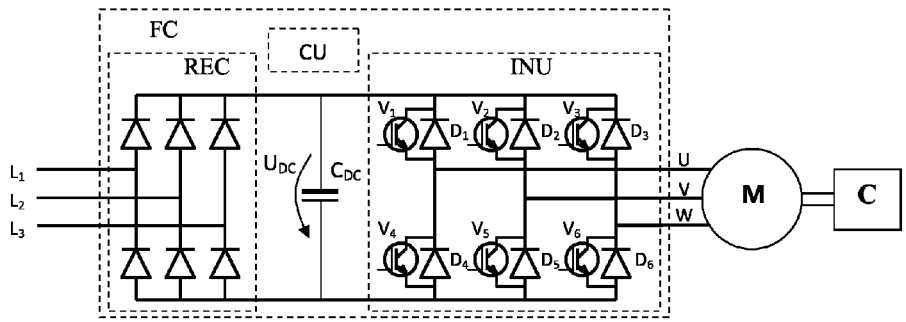
FIG. 3 presents a variable speed motor drive controlling the speed of a piston compressor.

FIG. 3 presents a known and typical variable speed motor drive that can be used to control the speed of a piston compressor C. The motor drive consists of a frequency converter FC and a motor M. The frequency converter FC in this example contains a diode-bridge rectifier REC, which rectifies the three-phase supply voltage $L_1$, $L_2$, $L_3$ into a constant DC-link voltage $U_{DC}$, which is smoothed by a capacitor $C_{DC}$, a three-phase inverter bridge INU, which consists of IGBT-switches $V_1$ . . . $V_6$ and free-wheeling diodes $D_1$ . . . $D_6$ and creates a three-phase output voltage U, V, W for the motor M, and a control unit CU.

Figure 4:
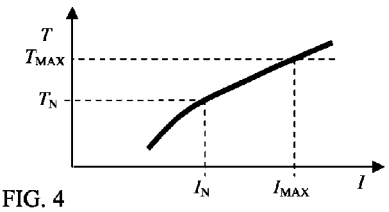
FIG. 4 presents a relation between the motor shaft torque and motor current.

FIG. 4 presents a known characteristic curve of the relation between the shaft torque T and stator current I of an electric motor at a constant speed. At the normal operation area between the nominal torque $T_N$ and maximum torque $T_{MAX}$ the relation is quite linear ($I_N$, $I_{MAX}$ respectively).

Figure 5:
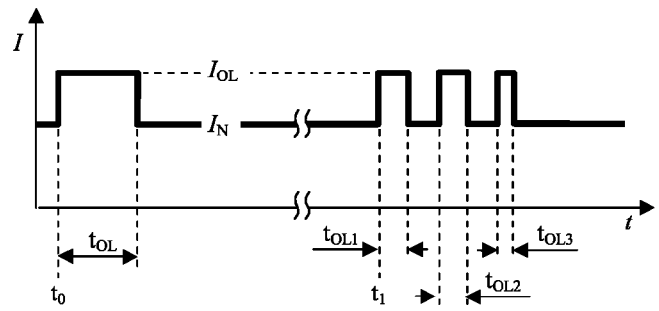
FIG. 5 presents an overload curve of a frequency converter.

FIG. 5 presents a known characteristic curve of the loadability of a frequency converter in relation to time t. The loadability is usually expressed as the value of the output current, and normally the converter can supply an over-load current $I_{OL}$ (e.g. twice the continuous nominal load current $I_N$) for a short period $t_{OL}$ (e.g. 2 seconds) during a certain load cycle $t_0$ . . . $t_1$, (e.g. 30 seconds). It is also possible to split the allowed overload time $t_{OL}$ to several shorter periods, like $t_{OL1}$, $t_{OL2}$ and $t_{OL3}$ in FIG. 4.

A known feature of a permanent magnet electric motor is that its rotor position follows the electric field created by the stator current. This makes it possible to adjust the rotor position without any position sensor when the electrical angle of the field is known and the load torque is not higher than the maximum motor shaft torque. The method and arrangement of the present invention is based on this fact.

Figure 6:
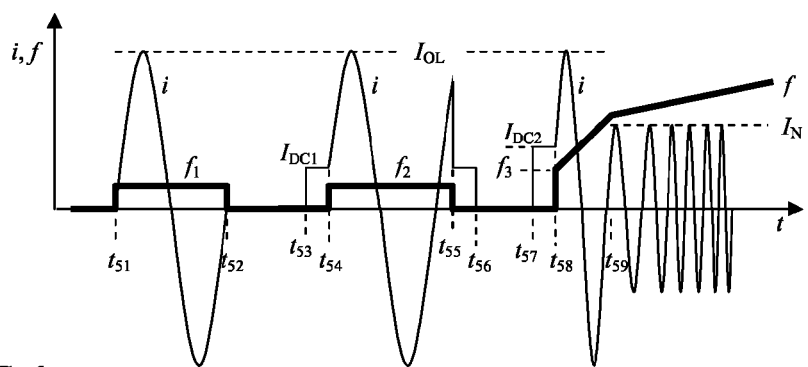
FIG. 6 presents a starting sequence of a piston compressor according to the invention.

FIG. 6 presents a characteristic behavior of one motor phase current i and frequency f during the start sequence according to the invention. The sequence consists of one or two current pre-pulses, followed by the actual start current.

The first pre-pulse may be used in the first embodiment of this invention, when the relationship between the rotor electrical and mechanical angle is unknown. The purpose of this pulse, lasting from $t_{51}$ to $t_{52}$, is to release the possible cylinder pressure, which may exist if the piston has remained at the maximum compression point (mechanical angle 180° in FIG. 1) after the previous stop. This pressure may cause a mechanical kick backwards against the desired rotary direction, which may cause the rotor to drop from the stator electric field rotation and thus the control system to lose information of the real shaft position. According to this invention the rotor is rotated one revolution at a frequency $f_1$ during the first pre-pulse, utilizing the overload capability of the frequency converter in order to have such high shaft torque which exceeds the load torque caused by the cylinder remaining pressure and starting friction. In FIG. 5 the motor current value is drawn to be at the overload level ($I_{OL}$), but it may be lower if the torque requirement can be met.

According to the first embodiment of this invention the purpose of the second pre-pulse, lasting from $t_{53}$ to $t_{56}$, is to find out the mechanical angle of the maximum cylinder pressure and at the end of the pulse to align the rotor at the optimum starting angle, which is about 180° from the maximum pressure angle. This is achieved by rotating the motor shaft at least one full electrical rotation, indicating the shaft torque value during the operation and stopping the rotation when optimum starting angle has been reached.

According to the second embodiment the first pre-pulse may be omitted and only the second current pulse used (lasting from $t_{53}$ to $t_{56}$ in FIG. 5). This is possible when the relationship between the rotor electrical and mechanical angle is known. In this case the pulse is started and stopped at the known optimum starting angle. By the rotation it will be ensured that the rotor angle is finally optimum in spite of friction and gas pressure effects.

In the beginning of the second pre-pulse the rotor may be set to a known starting electrical angle by feeding DC current to the stator (time period $t_{53}$ . . . $t_{54}$, $I_{DC1}$ indicates the current value of one phase), i.e. setting the converter output voltage vector to a certain position. Then the rotor is rotated at least one rotation at frequency $f_2$ from this position by supplying AC current to the stator, i.e. rotating the output voltage vector (time period $t_{54}$ . . . $t_{55}$). It is possible to indicate the load torque during this time e.g. by keeping the converter output frequency and current constant and measuring the output voltage, thus being possible to calculate the output power which is proportional to the shaft torque at constant speed. The condition for a capability to rotate a full rotation is that the shaft torque exceeds the maximum compression torque. This condition can be met by keeping the motor current at sufficiently high level. In FIG. 5 the motor current value is drawn to be at the overload level ($I_{OL}$), but it may also be lower if the torque requirement can be met. At the end of the second pre-pulse it may be advantageous to ensure the rotor to stay at the desired optimum starting angle by feeding DC current to the stator (time period $t_{55}$ . . . $t_{56}$).

The next phase is the actual start. According to the present invention the motor is started from a known optimum rotor position with maximal acceleration by utilizing the overload capacity of the frequency converter, in order to get maximum amount of kinetic energy for overshooting the first maximum compression torque point. The rotor is set to a starting electrical angle by feeding DC current to the stator (time period $t_{57}$ . . . $t_{58}$, $I_{DC2}$ indicates the current value of one phase), i.e. setting the converter output voltage vector to a certain position which is about half a revolution (180°) from the maximum pressure point. The actual start takes place from this position at time instant $t_{58}$ at maximum acceleration limited by the frequency converter overload current limit $I_{OL}$. At some time instant $t_{59}$ during the acceleration the allowed overload period of the frequency converter terminates, which means that the current limit drops to a lower level $I_N$, reducing also the shaft torque and thus also the acceleration rate after that instant.

Figure 7:
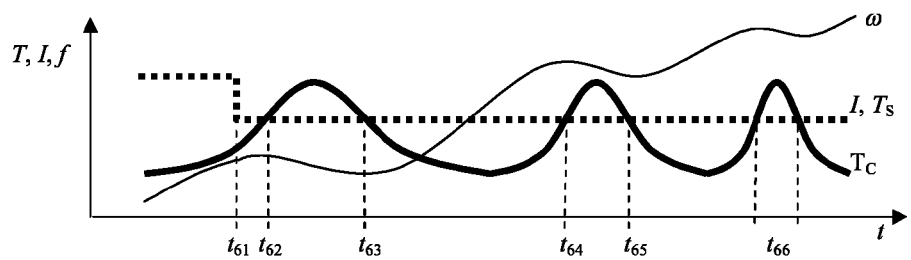
FIG. 7 presents a starting sequence of a piston compressor according to the invention.

FIG. 7 presents a characteristic behavior of motor current I, shaft torque $T_S$, compressor load torque $T_C$ and the motor shaft speed ω in the beginning of the actual start (i.e. from instant $t_{57}$ in FIG. 5). Because the current and torque are closely proportional to each other, they are presented by a common line in this figure.

Before time instant $t_{61}$ the motor current is at the overload limit and the acceleration at maximum. At time $t_{61}$ the overload period of the frequency converter terminates which means that also the maximum shaft torque drops below the maximum load torque level. At time instant $t_{62}$ the load torque increases above the shaft torque level which means that the shaft speed starts to decrease. A condition for the successful passing of this first maximum load torque period is that the kinetic energy of the rotating masses, collected during the acceleration period before time $t_{62}$, helps to keep the shaft speed at higher than the starting level before time instant $t_{63}$ where the speed again starts to increase. Similar torque level crossings take place later (during $t_{64} \ldots t_{65}$, $t_{66} \ldots t_{67}$ and so on), but they are not so critical because of higher speed and thus higher helping kinetic energy.

While the invention has been described with reference to the previous embodiment, it should be recognized that the invention is not limited to this embodiment, and many modifications and variations will become apparent to persons skilled in the art without departing from the scope and spirit of the invention, as defined in the appended claims.

The invention claimed is:

1. A method of starting a piston type compressor (C) driven by a permanent magnet synchronous motor (M) controlled by a frequency converter (FC),
   the method comprising at least following steps:
   a) indicating a position of a piston driven by the motor (M) at a highest pressure point of the compressor (C), and aligning a rotor of the motor (M) at an optimal starting angle prior to an actual compression operation by providing a pre-pulse at a certain frequency ($f_2$) for a duration of approximately one second for rotating the rotor of the motor (M) at least one full rotation, and
   during rotation, measuring a load torque by means of the frequency converter, and indicating a maximum load torque point, and
   at an end of the pre-pulse, aligning the rotor of the motor (M) at the optimal starting angle of about 180 degrees from a maximum pressure angle, and
   b) at a beginning of the actual compression operation, setting a position of the rotor opposite to the maximum torque angle by feeding direct current to a stator winding, and
   starting the motor by supplying a maximum direct current to the motor (M) to give maximum torque and acceleration.

2. The method according to claim 1, prior to step a), the method further comprising:
   providing another pre-pulse at a second frequency ($f_1$) for a duration of approximately one second
   the another pre-pulse rotating the motor (M) for one full rotation of the rotor, and releasing any remaining pressure from a cylinder.

3. The method of claim 2, the method further comprising:
   rotating the motor with a reduced rotating speed, and
   feeding direct current to the stator winding at a level that is high enough to create a torque by a crankshaft of the motor sufficient to overcome at least one of any remaining pressure in the cylinder and a starting friction of the motor.

4. The method according to claim 1, wherein the method further comprises the following step:
   prior to step a) defining a relationship between electrical and mechanical angles of the rotor, and starting and stopping the rotor during step a) at the optimal starting angle.

5. The method according to claim 1, at a beginning of step a), the method further comprising:
   setting the position of the rotor to a certain electrical angle by feeding the direct current to the stator winding.

6. The method according to claim 1, during step a), the method further comprising:
   rotating the motor at a constant rotating speed, and
   feeding the direct current to the stator winding at a level that is high enough to create a torque by a crankshaft of the motor sufficient to run over a maximum compression pressure point.

7. The method according to claim 1, during step b), the method further comprising:
   starting the motor by feeding the motor with the direct current that is limited by an overload current limit of the frequency converter,
   the limit of the overload current being twice as great as a continuous nominal load current, and the overload current having a duration of approximately two seconds.

8. An apparatus for starting a piston type compressor (C) driven by a permanent magnet synchronous motor (M) controlled by a frequency converter (FC), the apparatus being adapted to implement at least following steps:
   a) indicating a position of a piston driven by the motor (M) at a highest pressure point of the compressor (C), and aligning a rotor of the motor (M) at an optimal starting angle prior to an actual compression operation by providing a pre-pulse at a certain frequency ($f_2$) for a duration of approximately one second for rotating motor (M) at least one full rotation, and
   during rotation, measuring a load torque by means of the frequency converter, and indicating a maximum load torque point, and
   at an end of the pre-pulse, aligning the rotor of the motor (M) at the optimal starting angle of about 180 degrees from a maximum pressure angle, and
   b) at a beginning of the actual compression operation, setting a position of the rotor opposite to the maximum torque angle by feeding direct current to a stator winding, and
   starting the motor by supplying a maximum direct current to the motor (M) to give maximum torque and acceleration.

9. The apparatus according to claim 8, wherein the apparatus is further adapted to implement the following step: prior to step a)
   providing another pre-pulse at a second frequency ($f_1$) for a duration of approximately one second,
   the another pre-pulse rotating the motor (M) for one full rotation of the rotor, and releasing any remaining pressure from a cylinder.

10. The apparatus according to claim 9, wherein apparatus is adapted to implement at least the following steps:
rotating the motor with a reduced rotating speed, and
feeding direct current to the stator winding at a level that is high enough to create a torque by a crankshaft of the motor sufficient to overcome at least one of any remaining pressure in the cylinder and a starting friction of the motor.

11. The apparatus according to claim 8, wherein the apparatus is further adapted to implement the following step:
prior to step a) defining a relationship between electrical and mechanical angles of the rotor, and starting and stopping the rotor during step a) at the optimal starting angle.

12. The apparatus according to claim 8, wherein the apparatus is further adapted at the beginning of step a) setting the position of the rotor to a certain electrical angle by feeding direct current to the stator winding.

13. The apparatus according to claim 8, wherein the apparatus is further adapted to implement during step a)
rotating the motor at a constant rotating speed, and
feeding the direct current to the stator winding at a level that is high enough to create a torque by a crankshaft of the motor sufficient to run over a maximum compression pressure point.

14. The apparatus according to claim 8, wherein the apparatus is further adapted to implement during step b):
starting the motor by feeding the motor with the direct current that is limited by a limit of an overload current of the frequency converter,
the limit of the overload current being twice as great as a continuous nominal load current, and the overload current having a duration of approximately two seconds.

* * * * *